United States Patent [19]

Sawa et al.

[11] Patent Number: 4,759,170
[45] Date of Patent: Jul. 26, 1988

[54] FILLING AND PACKAGING METHOD AND APPARATUS THEREFOR

[75] Inventors: Yuji Sawa; Shoji Ohnishi, both of Tokyo, Japan

[73] Assignee: Kureha Chemical Industry Co., Ltd., Tokyo, Japan

[21] Appl. No.: 35,985

[22] Filed: Apr. 8, 1987

[30] Foreign Application Priority Data

Apr. 18, 1986 [JP] Japan .................. 61-088175

[51] Int. Cl.$^4$ .................. B65B 9/12; B65B 9/20
[52] U.S. Cl. .................. 53/551; 53/552
[58] Field of Search .............. 53/451, 479, 477, 138 A, 53/373, 551, 552

[56] References Cited

U.S. PATENT DOCUMENTS

| | | | |
|---|---|---|---|
| 3,324,621 | 6/1967 | Runge | 53/551 X |
| 3,432,980 | 3/1969 | Seiferth et al. | 53/551 X |
| 3,526,079 | 9/1970 | Maxeiner et al. | 53/551 |
| 3,611,657 | 10/1971 | Inoue et al. | 53/138 A X |
| 3,703,796 | 11/1972 | Inoue et al. | 53/551 X |
| 3,738,080 | 6/1973 | Reil | 53/551 |
| 3,780,488 | 12/1973 | Herrell | 53/479 X |
| 4,517,790 | 5/1985 | Kreager | 53/479 X |
| 4,589,247 | 5/1986 | Tsuruta et al. | 53/551 X |
| 4,622,793 | 11/1986 | Oki | 53/551 X |

FOREIGN PATENT DOCUMENTS 47-46289 of 1972 Japan .
46-46282 of 1972 Japan .
59-26424 of 1984 Japan .

*Primary Examiner*—Horace M. Culver
*Attorney, Agent, or Firm*—Rosen, Dainow & Jacobs

[57] ABSTRACT

A film made of synthetic resin is pulled continuously from a roll thereof and formed into a tubular shape the overlapping longitudinal edge portions of which are fused. The interior of the resulting tubular film is filled with a liquid or viscous material to form a tubular body fed while it is being formed. The tubular body is squeezed intermittently at a predetermined time interval by a pair of rotating cylindrical rollers to form flattened portions devoid of the material, after which each flattened portion is constricted transversely of the tubular body to form a constricted portion. An ultrasonic horn and an anvil are brought into abutting contact with the constricted portion, which is sealed ultrasonically by holding the ultrasonic horn and anvil in abutting contact therewith at a constant contact pressure for a set period of time while the ultrasonic horn applies ultrasonic waves to the constricted portion.

1 Claim, 4 Drawing Sheets

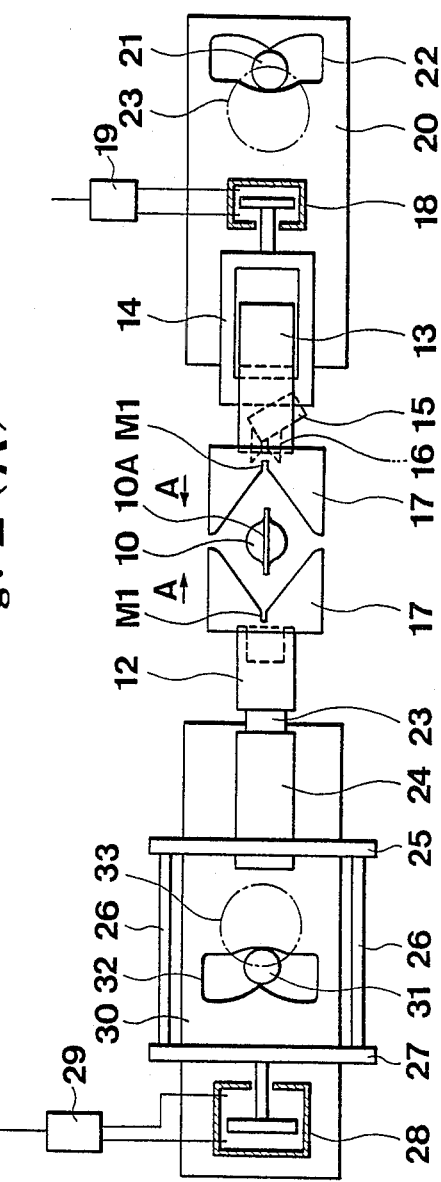
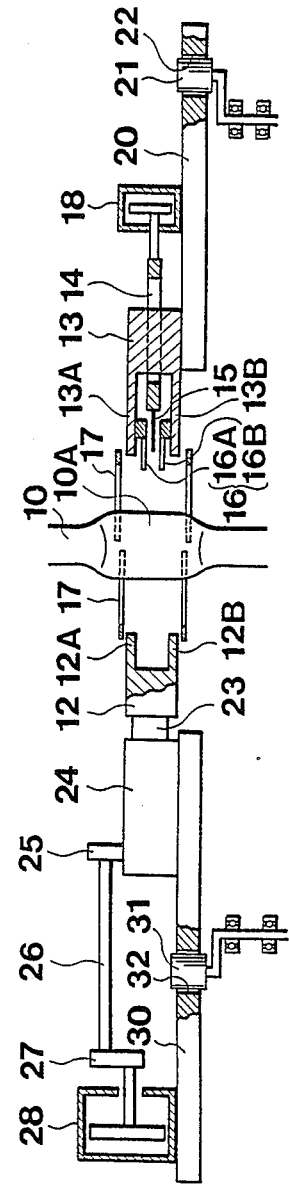
Fig. 2 (A)
Fig. 2 (B)

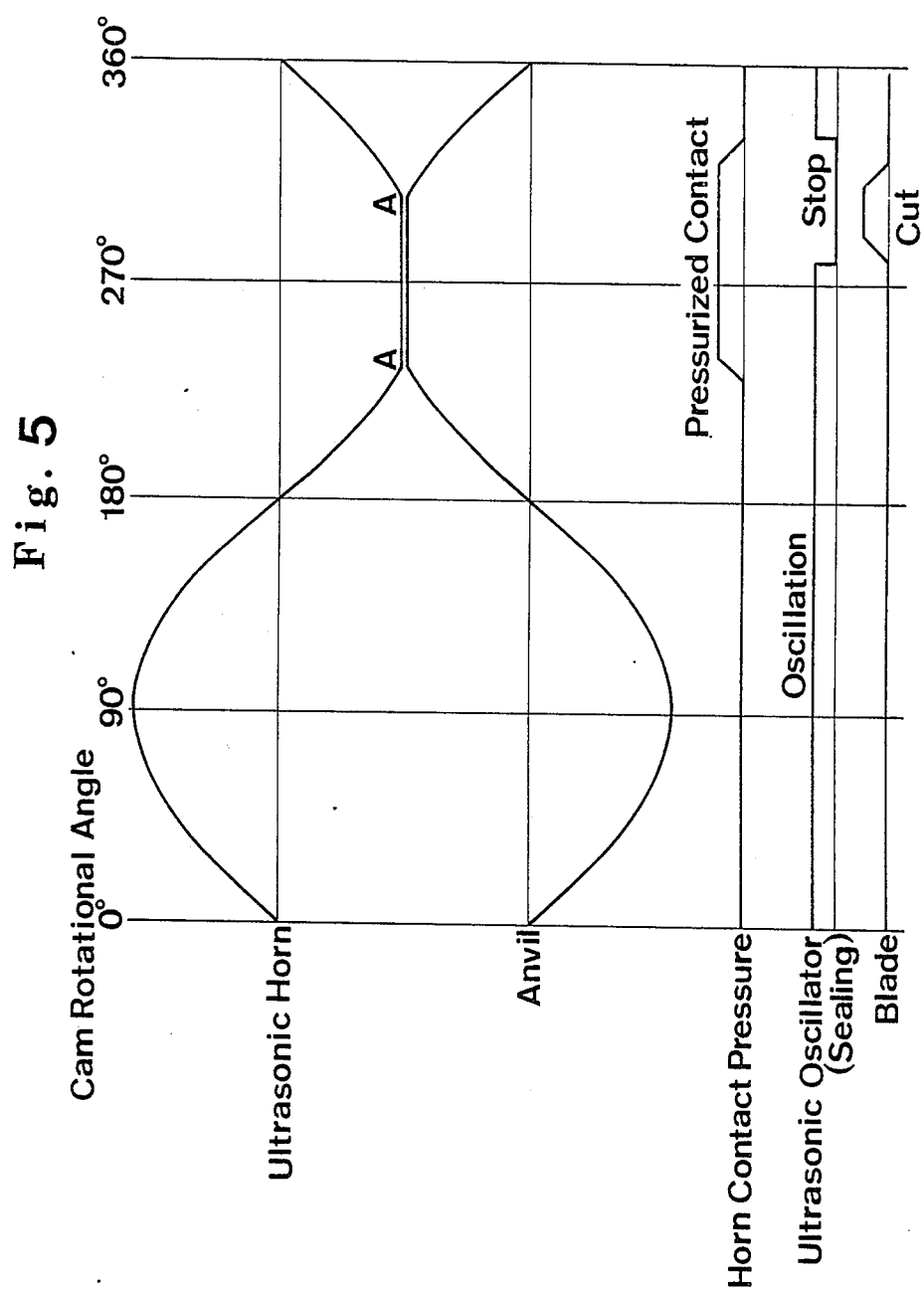

FILLING AND PACKAGING METHOD AND APPARATUS THEREFOR

BACKGROUND OF THE INVENTION

This invention relates to a method and apparatus for forming a flat film made of synthetic resin into a tube, filling the tube with a liquid or highly viscous material continuously while the tube is being formed, and producing a projectile-shaped package constituted by the filled film tube.

Projectile-shaped packages such as sausages or cheese sticks in which a tubular film is filled with the particular foodstuff are well-known in the art. A known method of manufacturing a package of this kind includes the steps of forming a flat film of synthetic resin into a tubular shape, forming a tube by fusing overlapped longitudinal side edges of the film while the film is being formed into the tubular shape, filling the interior of the tube continuously with a material to be packaged to produce a tubular body formed continuously by being stuffed with the material, squeezing the traveling tubular body intermittently at a predetermined time interval by a pair of rotating cylindrical rollers to form flattened portions by partially pushing aside the material where the tubular body is squeezed, constricting each flattened portion transversely of the tubular body, forcibly deforming an aluminum U-shaped wire clip at two points on the constricted portion to seal the same, and severing the constricted portion between the two wire clips.

The aforementioned sealing method which relies upon the wire clips does not provide a perfect seal and is a source of various problems. An expedient for providing a perfect seal is therefore desired. Methods of achieving this include effecting an ultrasonic seal between the two wire clips, as disclosed in the specifications of Japanese patent application Laid-Open (KOKAI) Nos. 47-46289, 46-46282, and providing an ultrasonic seal directly without using wire clips at all, as taught in the specification of Japanese patent application Laid-Open (KOKAI) No. 59-26424. Still, problems remain, as will now be set forth.

(1) In an arrangement where the film is clamped between an anvil and ultrasonic horn to effect a seal by the application of ultrasonic waves, a large clamping force is required. However, if a large clamping force is applied with an impact, the anvil and horn cause pinholes to form in the film, and in many cases the pinholes remain even after the sealing operation. This problem becomes pronounced at higher operating speeds.

(2) Despite the clamping of the film by the anvil and horn and the application of the ultrasonic waves, the film is clamped for only a short period of time. Consequently, when the electrode is simply detached after the sealing operation, the terminus of the seal easily develops a pinhole caused by the internal pressure of the filled material or when a force is mechanically applied to the film.

(3) When the film is constricted solely by upper and lower constricting devices, the constricted film between the devices spreads and unfolds. Then, when the film is clamped by the anvil and ultrasonic horn between the two constricting devices, there is a large disparity in the number of film overlaps from one location to another. As a result, pinholes readily form when ultrasonic sealing is applied. When it is attempted to achieve a perfect seal up to where there is the minimum number of overlaps, namely where only a two-ply overlap, the overall result is over-sealing. This results in tearing at the seal ends and the formation of pinholes. If the application of the ultrasonic waves is weakened, on the other hand, then the two-ply overlap will not be fused completely and the package will leak from this region.

(4) When a cutter is introduced to sever the film during sealing, the cutting force stretches the end of the seal and causes a pinhole to form. In addition, the cutting operation is difficult to perform. If the cut is made before sealing, the folds in the film will become undone and pinholes will form for the reasons set forth in (3) above.

SUMMARY OF THE INVENTION

Accordingly, an object of the present invention is to provide a filling packaging method through which ultrasonic sealing can be performed stably and safely even at high operating speeds.

Another object of the present invention is to provide an apparatus for practicing the abovementioned method.

According to the present invention, the first object is attained by providing a filling and packaging method which comprises the steps of: continuously pulling a film made of synthetic resin from a roll thereof and forming the film into a tubular shape; fusing overlapping longitudinal edge portions of the film while the film is being formed into the tubular shape, thereby obtaining a tubular film; continuously filling the interior of the tubular film with a material to be packaged to form a tubular body and feeding the tubular body while it is being formed; squeezing the fed tubular body intermittently at a predetermined time interval by a pair of rotating cylindrical rollers to form flattened portions devoid of the material, thereafter constricting each flattened portion transversely of the tubular body to form a constricted portion; bringing an ultrasonic horn and an anvil into abutting contact with the constricted portion; and sealing the constricted portion ultrasonically by holding the ultrasonic horn and anvil in abutting contact with the constricted portion at a constant contact pressure for a set period of time while the ultrasonic horn applies ultrasonic waves to the constricted portion.

According to the present invention, the second object is attained by providing a filling and packaging apparatus which comprises: fusing means for fusing overlapping longitudinal edge portions of a film made of synthetic resin while the film is being continuously pulled from a roll thereof and formed into a tubular shape, thereby obtaining a tubular film; material supply means for continuously filling the interior of the tubular film with a material to be packaged, thereby forming a tubular body; feeding means for feeding the tubular body; squeezing means having a pair of rotating cylindrical rollers for squeezing the fed tubular body intermittently at a predetermined time interval to form flattened portions devoid of the material; constricting means for constricting each flattened portion transversely of the tubular body to form a constricted portion; sealing means comprising an ultrasonic horn and an anvil for coming into abutting contact with the constricted portion from respective sides thereof at two positions in the direction of feed; cutting means for cutting through the constricted portion between the two positions; a pair of reciprocating plates arranged at positions on respective sides of the flattened portion transversely thereof for moving toward and away from each other in the transverse direction, the constricting means and the sealing means being arranged on the reciprocating plates and adapted to cooperate with each other when the reciprocating plates approach each other; means for moving the reciprocating plates toward and away from each other and for halting movement thereof for a set period of time when the ultasonic horn and anvil assume positions proximate the constricted portion; and pressurizing means for moving the ultrasonic horn and anvil relative to the reciprocating plates in order to bring them into abutting contact therewith at a set contact pressure substantially for the set period of time.

Though the contact pressure may be held constant from the beginning to the end of contact, it is possible to adopt an arrangement in which the pressure is applied at a low level temporarily at the beginning of contact and then increased and maintained at the increased level for a fixed period of time.

Thus, in accordance with the present invention, the tubular body obtained by filling the tubular film with the material to be packaged is squeezed to form a flattened portion, the flattened portion is constricted and the resulting constricted portion is ultrasonically sealed. When the ultrasonic sealing step is performed, the two reciprocating plates carrying the ultrasonic horn and anvil are stopped at positions very close to each other so that the horn and anvil do not impact against the constricted portion of the film when contacting the same. This assures that the constricted portion will not be damaged to prevent the formation of pinholes or the like. Further, since the ultrasonic horn and anvil are maintained in a state where they apply a constant, set contact pressure to the constricted portion for a set period of time, an optimum contact pressure and contact time can be obtained. As a result, the film develops neither pinholes nor any other flaws. This means improved product reliability with regard to quality over an extended period of time. This advantage becomes even more apparent and renders the invention far superior to the prior art when the filling and packaging apparatus is run at high speed. In other words, the invention makes high-speed operation possible while assuring product quality, thus contributing to improved mass production.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2(A) is a more detailed view of the apparatus of FIG. 1 as seen in the direction of the arrows II—II;

FIG. 2(B) is a side view, partially broken away, illustrating a portion of the apparatus of FIG., 2(A);

FIG. 5 is a graphical representation showing the operating sequence of various elements in FIG. 4.

DESCRIPTION OF THE PREFERRED EMBODIMENT

A preferred embodiment of a filling and packaging apparatus according to the invention will now be described with reference to the accompanying drawings.

Figure 1:
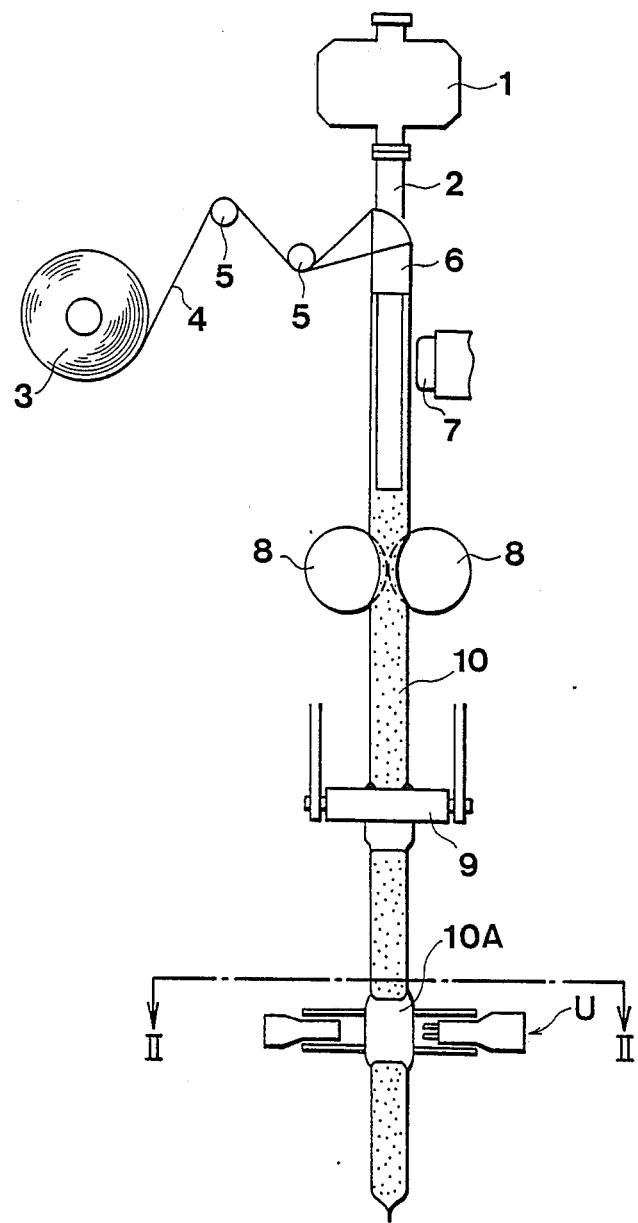
FIG. 1 is a simplified schematic view showing the entirety of a filling and packaging apparatus embodying the present invention.

As shown in FIG. 1 illustrating the overall arrangement of the apparatus, a supply pump 1 serving as means for supplying a material to fill a tubular film has a lower end to which a nozzle 2 is connected. Located on one side of the apparatus is a roll 3 of coiled flat film 4 made of synthetic resin. The flat film 4 is pulled off the roll 3 via guide rolls 5 and is then formed into a tubular shape by a forming plate 6. The longitudinal edge portions of the film 4 thus shaped overlap each other and are sealingly fused together by a sealing electrode 7 serving as fusing means. The film 4 is thus formed into a perfect tube.

The tubular film 4 resulting from the foregoing process is pulled downwardly in FIG. 1 in continuous fashion by a set of film feed rolls 8 constituting conveyance means. Meanwhile, the material to be packaged is fed out by the supply pump 1 and is continuously stuffed into tubular film 4 through the nozzle 2. The tubular film 4 is thus filled with the material to be converted into a continuous tubular body 10. The latter is squeezed at a set time interval by squeezing means comprising a pair of rotating cylindrical rollers 9 (only one being shown), whereby the material filling the interior of the tube is partially pushed aside to form a flattened portion 10A. The latter is constricted transversely of the tube by constricting means and is ultrasonically sealed.

Since a characterizing feature of the invention resides in the sealing of the constricted portion, this will now be described in detail.

In the apparatus of the invention, the sealing means is arranged on reciprocating plates, described below, together with the constricting means and cutting means and forms a single unit U together therewith. This unit is provided below the rotating squeezing rollers 9 and performs constricting, sealing and cutting operations while undergoing reciprocating motion.

As shown in FIGS. 2(A), (B), the tubular body 10 obtained by filling the tubular film with the material is situated at the center of the unit U, with the elements constituting the unit U being arranged on both sides of the flattened portion 10A transversely thereof. The unit U includes two reciprocating plates 20, 30 moved toward and away from each other by cams engaging respective ones of the plates near their ends. The directions in which the plates move to approach each other shall be referred to hereinafter as the forward direction. The reciprocating plates 20, 30 are provided with respective arcuate cam slots 22, 32 mating with drive wheels 21, 31 that rotate along pitch circles 23, 33, respectively, thereby moving the plates 20, 30 toward and away from each other.

Figure 4:
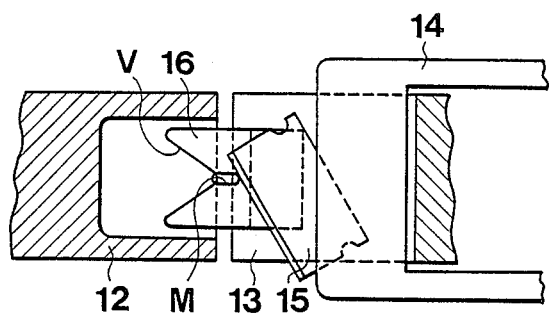
FIG. 4 is a view of the sealing station of FIG. 3 as seen in the direction of arrows IV—IV.

Mounted on the reciprocating plate 20 is a cylinder 18 which receives pressure from a drive source, not shown, via a switching valve 19. The cylinder 18 has a piston rod to the forward end of which is fixedly secured a frame 14 carrying a blade 15 constituting the aforementioned cutting means. An anvil 13 cooperating with an ultrasonic horn, described below, to form sealing means is integrally attached to the reciprocating plate 20 at a location in the space defined interiorly of the frame 14. The anvil 13 has a a groove at its forward end which divides the anvil into two abutment portions 13A, 13B at upper and lower positions near the frame 14. Each of the two abutment portions 13A, 13B has a forward end face defining a sealing face. Two constricting plates 16A, 16B (designated generally by numeral 16) projecting forwardly beyond the ends of the abutment portions 13A, 13b are attached to the inner sides thereof near the blade 15. As shown in FIG. 4, the constricting plate 16 has a V-shaped cut-out V open in the forward direction, and a slender elongated slot M communicating with the apex of the V-shaped cut-out V.

Figure 3:
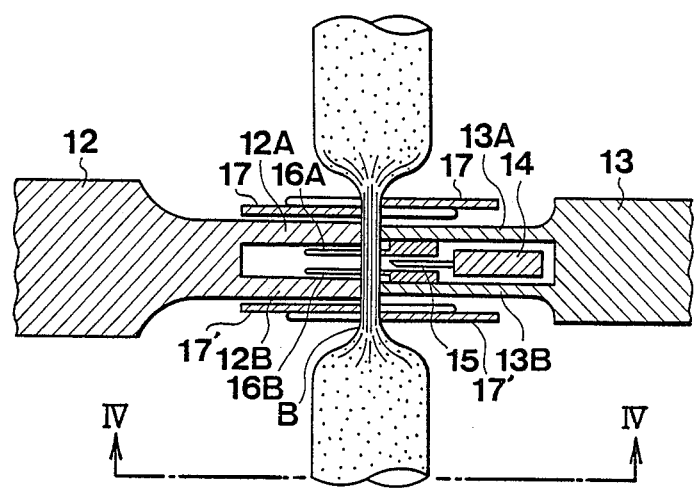
FIG. 3 is a detailed sectional view illustrating a sealing station in the apparatus of FIG. 1.

Mounted on the aft portion of the other reciprocating plate 30 is a cylinder 28 which receives pressure from a drive source, not shown, via a switching valve 29. The cylinder 28 has a piston rod attached to an aft member 27 of a frame 26. The frame 26 has a forward member 25 to which an ultrasonic generating device 24 is attached. An ultrasonic horn 12 projects forwardly from the ultrasonic generating device 24 via an amplifying device 23. The forward portion of the horn 12 is provided with a hole obtained by closing both sides of a groove, thereby forming upper and lower abutment portions 12A, 12B the end faces thereof define sealing faces which meet the abutment portions 13A, 13B of the anvil through the intermediary of the film to clamp and seal the same. Numerals 17, 17' denote constricting plates which operate in advance of the aforementioned constricting plates 16A, 16B and constitute constricting means together therewith. The constricting plates 17, 17', each of which includes a V-shaped cut-out and a slender elongated slot M communicating with the apex of the V-shaped cut-out for forming the constricted portion of the film, are supported so as to be slidable in the same directions as the reciprocating plates and are coupled to the reciprocating plates via springs in the unit U. (The relationship between the constricting plates and reciprocating plates does not have a direct bearing upon the present invention and therefore is deleted from the drawings. In this connection, the state shown in FIG. 3 is one in which a constricted portion is being formed by the constricting plates 17, 17 constricting the flattened portion, with the horn 12 and anvil 13 being shown in abutting contact with the constricted portion. In FIG. 3, the blade 15 has not yet been advanced to sever the constricted portion.)

The operation of the apparatus constructed as set forth above will now be described. The operating sequence will be discussed mainly in conjunction with FIG. 5.

When the drive wheels 21, 31 rotate along the pitch circles 23, 33, respectively, the reciprocating plates 20, 30 are moved toward and away from each other. The motion is as illustrated in FIG. 5, where the rotational angle of the drive wheels is plotted along the horizontal axis and the amount of movement along the vertical axis. It will be seen that the motions of the ultrasonic horn 12 and anvil 13 approximate symmetrical sine waves in the positive and negative direction. However, since a portion of each of the cam grooves 22, 32 has a curvature the same as that of the pitch circles 23, 33, a flat portion is formed between points A—A in FIG. 5. The reciprocating plates 20, 30 are closest to each other over the interval A—A. Concurrently, the ultrasonic horn 12 and the anvil 13 draw very near to the constricted portion of the film. The cylinder 28 is actuated by the switching valve 29 substantially at the starting point of the interval A—A to advance its piston, so that the ultrasonic horn 12 and anvil 13 come into abutting contact with the constricted portion of the film at a set contact pressure. The abutting contact continues over the interval A—A, as depicted in FIG. 5.

Since the forward portion of the anvil 13 is provided with the two forward extending constricting plates 16A, 16B, the flattened portion 10A of the tubular body 10 is forced into the elongaged slots M of constricting plates 16A, 16B via the cut-outs V thereof when the anvil 13 approaches the ultrasonic horn 12, whereby the flattened portion is formed into a constricted portion B having a generally circular cross section. At this time the constricted portion B (see FIG. 3) is sealed sufficiently at upper and lower positions by the ultrasonic horn 12 and anvil 13 under a contact pressure applied for a set period of time.

In the latter half of the aforementioned set time period, the ultrasonic vibrations for sealing are halted and the cylinder 18 is actuated by switching valve 19 to advance the frame 14, whereby the constricted portion B is severed by the blade 15 between the upper and lower sealed portions.

Thus, when the reciprocating plates 20, 30 begin to move away from each other, a single projectile-shaped packaged article drops away the tubular body 10 and is delivered via a chute to an article receptacle or to a conveyor or the like which carries the packaged article to a subsequent process.

The reciprocating plates 20, 30 are moved away from each other by rotation of the drive wheels 21, 31 along the pitch circles 23, 33, and operation of the cylinder 28 is switched over by the switching valve 29, whereby the elements constituting the unit U are retracted. The next cycle of operation then begins.

As many apparently widely different embodiments of the present invention can be made without departing from the spirit and scope thereof, it is to be understood that the invention is not limited to the specific embodiments thereof except as defined in the appended claims.

What is claimed is:

1. A filling and packaging apparatus which comprises:
   fusing means for fusing overlapping longitudinal edge portions of a film made of synthetic resin while the film is being continuously pulled from a roll thereof and formed into a tubular shape, thereby obtaining a tubular film;
   material supply means for continuously filling the interior of the tubular film with a material to be packaged, thereby forming a tubular body;
   feeding means for feeding the tubular body;
   squeezing means having a pair of rotating cylindrical rollers for squeezing the fed tubular body intermittently at a predetermined time interval to form flattened portions devoid of the material;
   constricting means for constricting each flattened portion transversely of the tubular body to form a constricted portion;
   sealing means comprising an ultrasonic horn and an anvil for coming into abutting contact with the constricted portion from respective sides thereof at two positions in the direction of feed;
   cutting means for cutting through the constricted portion between the two positions;
   a pair of reciprocating plates arranged at positions on respective sides of the flattened portion transversely thereof for moving toward and away from each other in the transverse direction, said constricting means and said sealing means being arranged on said reciprocating plates and adapted to cooperate with each other when said reciprocating plates approach each other;

means for moving said reciprocating plates toward and away from each other and for halting movement thereof for a set period of time when said ultasonic horn and anvil assume positions proximate the constricted portion; and pressurizing means for moving said ultrasonic horn and anvil relative to said reciprocating plates in order to bring them into abutting contact therewith at a set contact pressure substantially for said set period of time.

* * * * *